US007869047B2

(12) United States Patent
Henderson

(10) Patent No.: US 7,869,047 B2
(45) Date of Patent: Jan. 11, 2011

(54) IN-LINE SELF SPACING OPTICAL SENSOR ASSEMBLY FOR A PRINTER

(75) Inventor: Thomas A. Henderson, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 214 days.

(21) Appl. No.: 12/337,673

(22) Filed: Dec. 18, 2008

(65) Prior Publication Data

US 2010/0157305 A1 Jun. 24, 2010

(51) Int. Cl.
*G01N 21/55* (2006.01)

(52) U.S. Cl. ........................................ 356/445; 356/448

(58) Field of Classification Search ......... 356/445–448; 400/703, 55–59; 73/431; 347/19; 271/265.01, 271/153, 3.15, 10.02, 10.03, 264, 10.04; 250/239, 555–557

See application file for complete search history.

(56) References Cited

U.S. PATENT DOCUMENTS 6,464,414 B1 10/2002 Washnock

FOREIGN PATENT DOCUMENTS

JP 03 009662 A 1/1991
JP 06 086010 A 3/1994
JP 06 273602 A 9/1994

*Primary Examiner*—Gregory J Toatley
*Assistant Examiner*—Tri T Ton
(74) *Attorney, Agent, or Firm*—William R. Zimmerli; Eugene I. Shkurko

(57) ABSTRACT

An in-line optical sensor assembly that measures optical reflection density on a printed sheet horizontally conveyed and supported by a paper transport section of a printer is provided. The sensor assembly includes a densitometer having frame provided with a pair of tapered blades that engage the moving printed sheet, a light source disposed on said frame that illuminates a portion of said printed sheet at a continuous intensity, and a photo-detector mounted on the frame and positioned to receive light from the light source that is reflected off said printed sheet. The optical sensor assembly also includes a mounting that floatably mounts the densitometer in a position over the printed sheet. The mounting can be formed from an opening in a cover plate of the paper transport section that slidably receives the densitometer such that the pair of tapered blades continuously engages the moving sheet in ski-like fashion due to the weight of the densitometer. The floating mounting arrangement maintains a constant, predetermined distance between the photo-detector of the densitometer and the illuminated portion of the moving printed sheet regardless of vertical movement of the printed sheet within said paper transport section.

20 Claims, 8 Drawing Sheets

IN-LINE SELF SPACING OPTICAL SENSOR ASSEMBLY FOR A PRINTER

FIELD OF THE INVENTION

This invention generally relates to photometers for measuring the optical reflection density on printed sheets of paper, and is specifically concerned with an in-line self-spacing sensor that measures the optical reflection density of color test patches periodically printed on sheets moving through a paper transport section of a printer.

BACKGROUND OF THE INVENTION

In electrostatographic printers, printing parameters such as primary charger setpoint, exposure setpoint, toner concentration, and development bias must be periodically adjusted in order to maintain consistent color characteristics in the images being printed. Printer process control strategies typically involve measuring the reflective optical density of a toner image on an exposed and developed area on a printed sheet (called a "test patch"). Optical density has the advantage, compared to transmittance or reflectance measures, of matching more closely to human visual perception. A further advantage of relying on an optical density measurement to maintain consistent color characteristics in the printed images is that density is approximately proportional to the thickness of the marking material layer over a substantial range. The optical sensors used to make such reflection density measurements are known as densitometers. Such densitometers include an array of photo-transistors covered with a mask of color filters, and a light source that provides white light at a constant intensity. In operation, the photo-transistor array generates separate pulse frequency signals indicative of the density of selected light wavelengths (which typically correspond to red, blue, and green) as it scans the test patches of color.

An "in-line" densitometer refers to a densitometer that is mounted on the printer itself, and which measures the reflective density of test patches on printed sheets moving through a paper path in the printer. Density measurements are transmitted to the digital color controller of the printer as the densitometer scans the moving sequence of test patches (which are typically a series of cyan, magenta, yellow, gray and black rectangles) on the printed test sheets. From the input provided by the in-line densitometer, the digital color controller of the printer can determine whatever adjustments might be necessary to the color process control parameters to maintain consistent color characteristics in the printed images.

As indicated in FIG. 1, one location where an in-line densitometer 1 may advantageously be mounted on an electrostatographic printer is in the top plate of the paper transport section 3 immediately downstream of the fuser roller 5. This transport section 3 is sometimes referred to as the "fuser extension," and includes a horizontally oriented bottom plate 7 to support the printed sheets 9 during transport. Often, due to the possibility of paper jams, this paper transport section 3 includes a top plate 11 having hinges 13 that allows it to be opened and then closed after the paper jam is cleared. Paper 9 that passes through this transport section 3 is propelled by pinch rollers 15*a, b* in the direction "A" but otherwise is free within the confines of the top and bottom plates 7, 11.

In order for the densitometer to provide consistent and accurate image density data to the digital color controller of the printer, it is necessary to maintain a constant vertical distance X between the array of phototransistors and sheets 9 printed with the test patches. The criticality of maintaining such a constant distance is illustrated in the graph of FIG. 2, where the horizontal and vertical axes represent phototransistor spacing (in millimeters) to the test sheets and the difference (or minimum delta) in the pulse frequency output of the densitometer indicative of a measured color density, respectively. As is evident from this graph, a variation of 0.50 millimeters from an optimal distance of about 2.3 millimeters will cause a minimum error of about 100 pulses per second to occur in images having mid to high saturation. Such a 0.50 millimeter variation in X may occur, for example, by the fluttering of the leading edge of the paper 9 as it is propelled by the pinch rollers 13*a, b*. The resulting minimum error of about 100 pulses per second in turn corresponds to a density measurement error of between about 1% and 5%, which is sufficient to result in perceptible variations in the color characteristics of a single image being printed multiple times.

One prior art solution to this problem is the provision of an optical system that compensates for variations in X. However, such systems require the use of a custom-made arrangement of precision lenses and hence are relatively complicated and expensive. Moreover, inaccurate measurements can still occur in situations where the vertical distance X varies beyond the capacity of the optical system to compensate. Another prior art solution seeks to maintain the vertical distance X by providing a precision-made top latch and hinge for the accurate re-positioning of the top plate relative to the bottom plate of the paper transport section, in combination with a spring-loaded mounting between the housing of the densitometer and the top plate to hold the paper in sliding engagement against the supporting, bottom plate. However, even when such mechanical components are provided, the applicant has observed that the vertical orientation of the typically metallic top plate in the paper transport section can vary a millimeter or more due to thermal differential expansion as a result of the combined variable heat output from the fuser roller located immediately upstream and the opening/closing action of the cover.

Clearly, there is a need for an in-line densitometer mountable in the fuser extension transport section of an electrostatographic printer that provides reliable color density measurements without the need for lenses or precision mechanical mounting components and overcomes all of the aforementioned disadvantages associated with prior art designs.

SUMMARY OF THE INVENTION

The invention is an in-line optical sensor assembly mounted in a paper transport section of a printer that maintains a constant vertical distance between its phototransistor array and printed sheets moving under the densitometer without the need for either precision-made latches and hinges in the transport section, or a spring-loaded mounting between the densitometer and a top plate of the transport section.

To this end, the in-line optical sensor assembly comprises (1) a densitometer including a frame having an engagement portion that engages a printed sheet moving in a transport section of a printer; a light source mounted on the frame that illuminates a portion of the printed sheet at a continuous intensity; a photo-detector mounted on the frame and positioned to receive light from the light source that is reflected off said printed sheet, and (2) a mounting that floatably mounts the densitometer in the printer such that the engagement portion slides over the printed sheet as it moves through the paper transport section. The weight of the densitometer maintains the engagement portion of the frame in constant, sliding contact with the top surface of the moving sheet. The resulting constant, sliding contact advantageously maintains the critical vertical distance between the photo-detector mounted in the densitometer housing and the illuminated portion of the moving printed sheet, and obviates the need for lenses. This critical vertical distance is maintained regardless of vertical movement of the printed sheet within said paper transport section due to fluttering, or changes in the vertical orientation of the top plate due to tolerances in the latches and hinges that pivotally mount the plate to the transport section plate, or thermal differential expansion of the sheet metal forming the top plate.

In the preferred embodiment, the floating mounting is an opening in the top plate that loosely receives the frame of the densitometer, and the engagement portion is constituted by tapered, blade-like members such that the densitometer slides over the moving printed sheets in ski-like fashion. Moreover, the weight of the densitometer is selected within a range (i.e. between about 12 and 20 grams) sufficient to maintain constant sliding contact between the tapered, blade-like members without promoting snagging or binding that could result in paper jams. Such a simple floating mounting formed by an opening in the top plate and that operates by the weight of the densitometer obviates the need for precision mechanical mounting components. Further, the photo-detector is positioned on the frame to preferably receive only light from the light source that is diffusely reflected from the printed sheet, and the light source is mounted on the housing at an angle that transmits light at an oblique angle toward the printed sheet. Advantageously, the frame has an aperture that conducts light reflected by said printed sheets to the photo-detector without the need for a focusing lens.

DETAILED DESCRIPTION OF THE INVENTION

Figure 1:
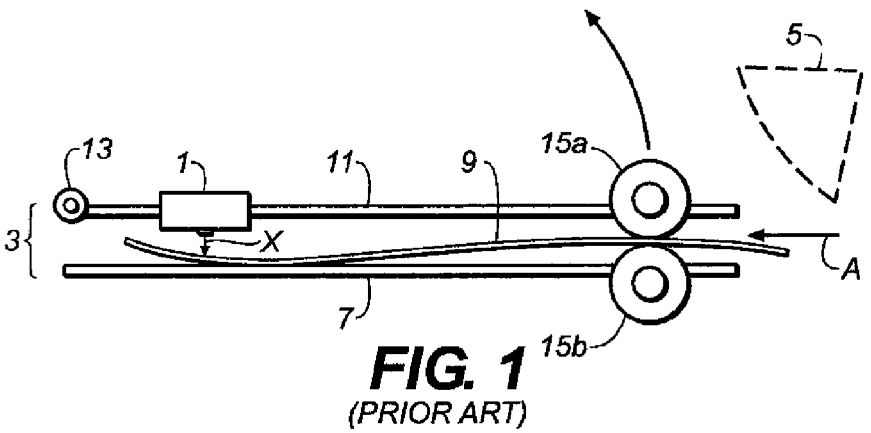
FIG. 1 (PRIOR ART)
FIG. 1 is schematic, side cross-sectional view of a paper transport section of an electrophotographic printer having an in-line densitometer.
Figure 2:
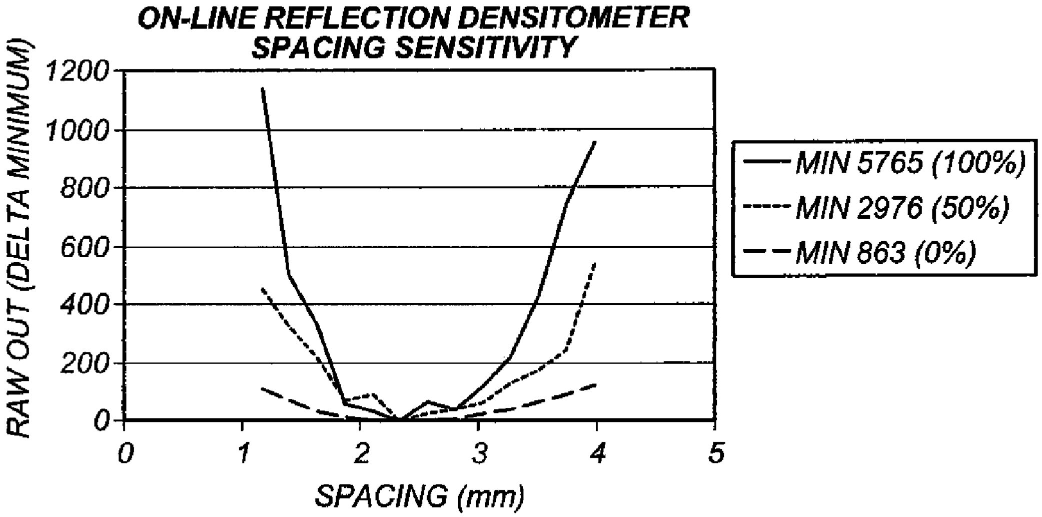
FIG. 2 is a graph illustrating the minimum pulse error of a densitometer pulse output as a function of variations from the critical, vertical spacing between the array of phototransistors of the densitometer and the surface of the printed paper being scanned.
Figure 3:
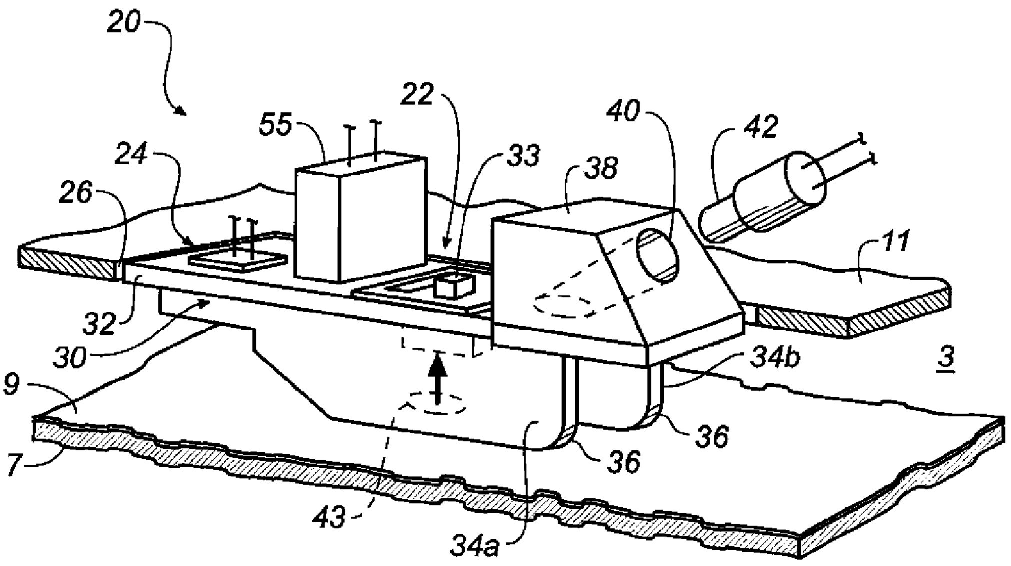
FIG. 3 is a perspective, partially exploded view of the optical sensor assembly of the invention illustrating the densitometer of the invention floatingly mounted in an opening in the top plate of a paper transport section of a printer.

With reference to FIG. 3, wherein like numerals designate like components throughout all the several Figures, the optical sensor assembly 20 of the invention generally comprises a densitometer 22 and a mounting 24 that floatably mounts the densitometer 22 over printed sheets 9 moving within a paper transport section 3 of a printer. When the printer is an electrostatographic printer, the paper transport section 3 can be the paper transport section immediately downstream of the fuser roller. In the preferred embodiment, the floating mounting 24 is simply a rectangular opening 26 in the top plate 11 of the paper transport section 3 that is complementary in shape but slightly larger than the rectangular frame 30 of the densitometer such that the densitometer frame 30 is loosely received therein. Such dimensioning allows the densitometer frame 30 to move freely in the vertical direction in response to vertical movements of the paper 9 while preventing the densitometer 22 from lateral movement.

The sensor frame 30 has a rectangular table portion 32 for supporting the densitometer circuitry 33, and a pair of engagement blades 34*a, b*. The upper portions of the engagement blades 33*a, b* are preferably integrally molded to the underside of the table portion 32, while the bottom edges have tapered leading edges 36 such that the over-all shape is similar to that of an ice-skating blade. In the preferred embodiment, the frame 30 is formed from a moldable, lightweight, high strength and wear-resistant plastic material having natural lubricating properties such as the polyoxymethylene-based resin sold by the DuPont Company located in Wilmington, Del. under the brand name Delrin. The frame 30 is preferably black in color to avoid spurious reflections which could interfere with the accuracy of the light intensity measurements taken by the densitometer circuitry 33.

Figure 4:
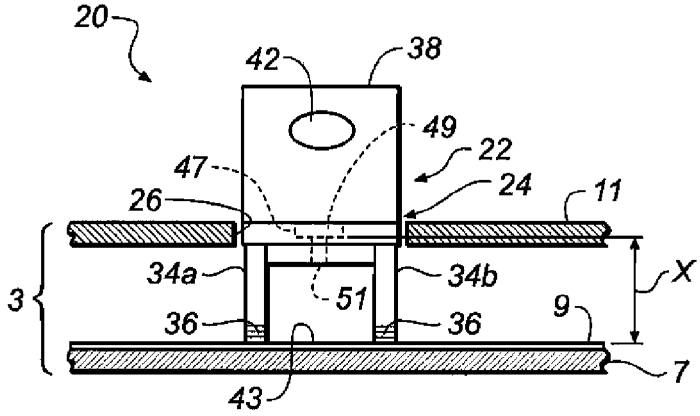
FIG. 4 is a front view of the optical sensor assembly shown in FIG. 3 with the paper transport section shown in cross-section.
Figure 5:
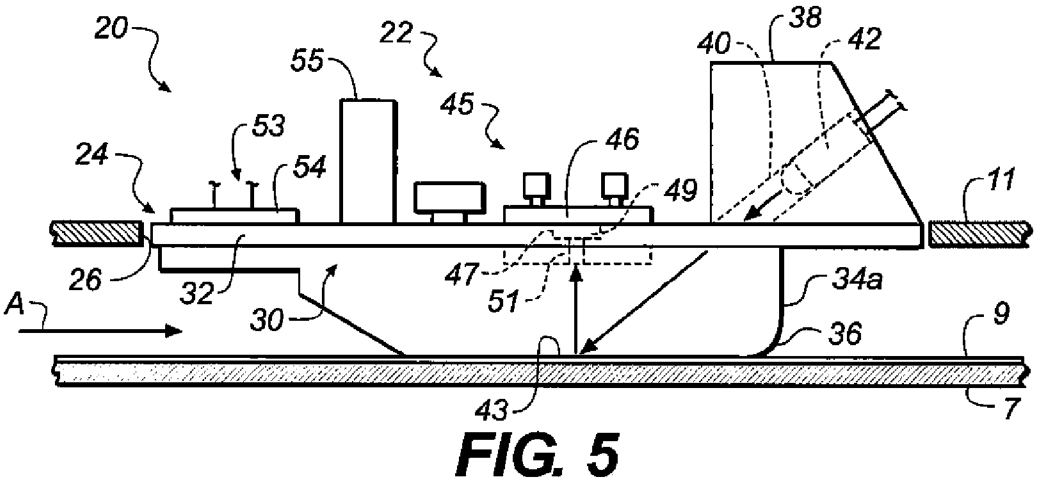
FIG. 5 is a side view of the optical sensor assembly shown in FIG. 3 with the paper transport section shown in cross-section.

With reference now to FIGS. 4 and 5, wherein paper travel is indicated by the direction “A”, a light-source housing 38 is provided on the trailing end of the table portion of the frame 30. Housing 38 includes a cylindrical bore for receiving a white LED (shown in exploded view in FIG. 3). The LED can be, for example, a model number NSPW500CS Bright White LED sold by the Nichia Corporation located in Tokyo, Japan. While many other light sources can be used to implement the invention, it is important that the light source be capable of providing a broad range of visible light wavelengths so that the densitometer circuitry 33 can provide relatively balanced signal strengths for the different colored test patches. The angle of the bore 40 that receives the LED is preferably 45 degrees as indicated in FIG. 5 so that the LED illuminates an elliptically shaped portion 43 of the printed sheet 9 directly beneath the optical sensor of the densitometer circuitry 33. It should be noted that the total weight of the densitometer 22 is preferably between 12 and 20 grams, and more preferably between 14 and 18 grams, and is most preferably 16 grams for reasons which will become evident hereinafter.

Figure 6:
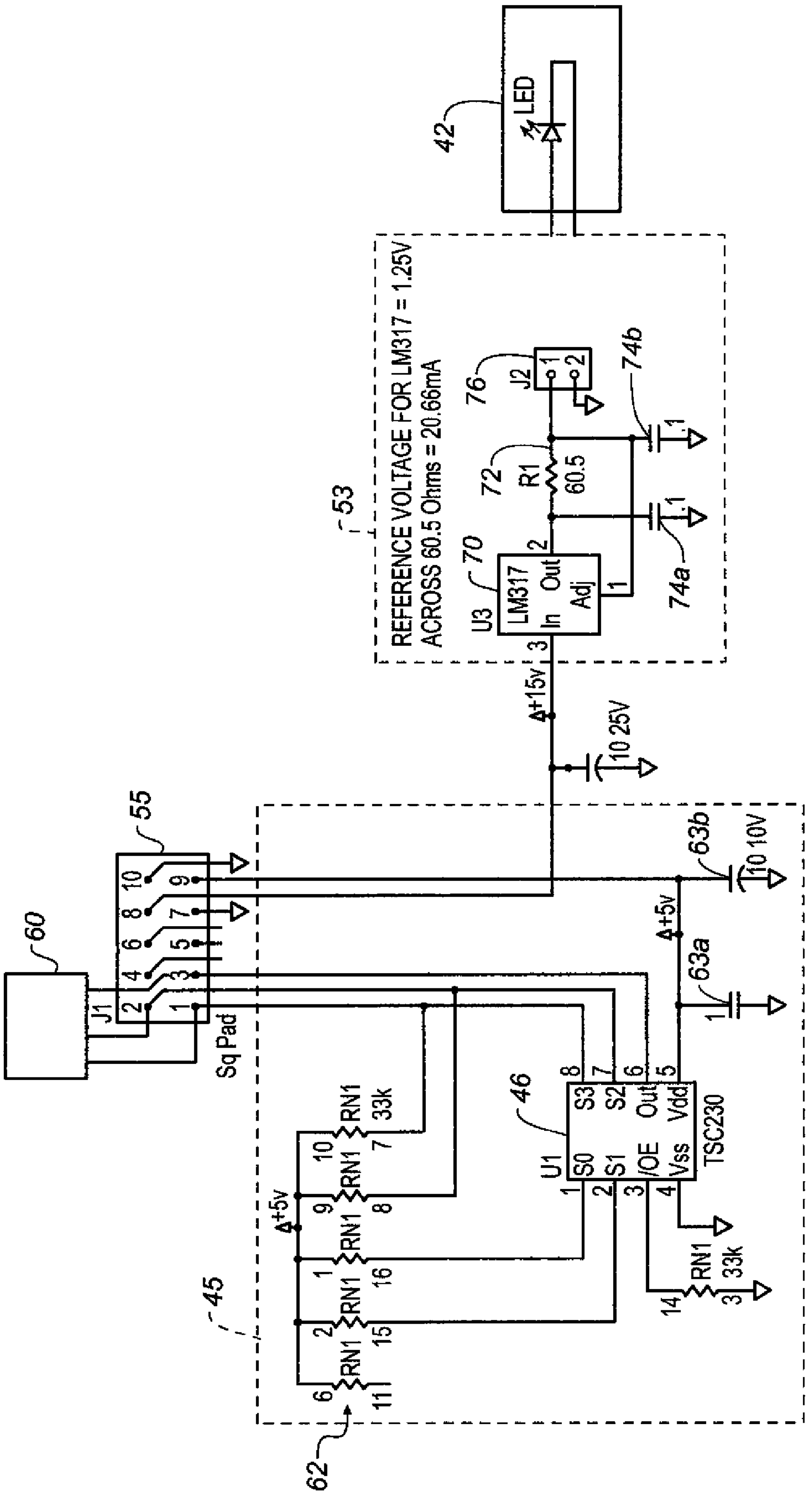
FIG. 6 is a schematic view of the circuitry used in the densitometer of the optical sensor assembly of the invention.

With reference to FIGS. 5 and 6, the components of the densitometer circuitry 33 mounted on the table portion 32 include an optical sensor circuit 45, a constant current circuit 53 including a current control IC 54 for powering the white LED 42, and an electrical socket 55 connected to a remotely located digital control IC 60 and power source for conducting control signals to the optical sensor IC 45 and power to the circuit 53.

The optical sensor circuit 45 includes a sensor IC 46 which is preferably a Taos TSC230 sensor chip manufactured by Texas Advanced Optoelectronic Solutions, Inc., located in Plano, Tex. The output of this device is a square wave or pulse train whose frequency is linearly proportional to light intensity and features a dynamic range of 120 dB. The bottom side of the sensor IC 45 includes an array of phototransistors 47 masked with a red, green, and blue color filter so that equal numbers of the phototransistors generate separate square wave pulse trains whose corresponding to the intensity of red, green and blue as the densitometer scans the sample patches on printed sheets 9 moving under the densitometer frame 30. The top surface of the table portion 32 of the frame 30 includes a circular recess 49 for receiving the array of phototransistors 47. A circular aperture 51 extends from the center of the recess 49 through the bottom surface of the table portion 32 of the frame 30. As is best seen in FIG. 5, the aperture 51 conducts diffusively reflected light from the elliptically-shaped portion 43 of the paper 9 illuminated by the white LED 42. It is of course possible to arrange the angle of the LED 42 and bore 40 such that specularly reflected light is received by the aperture 51. However, the use of diffusively reflected light is preferred as is more closely duplicates the lighting conditions that an ordinary observer views an image in. In the preferred embodiment, the diameter of the circular aperture 51 is 1.0 millimeters. Such a small aperture helps to resolve a "clean break" between test patches of different colors as they are scanned by the densitometer 22, and allows the color calibration test to be conducted with printed sheets having a greater number of colored test patches. With specific reference to FIG. 6, the optical sensor circuit 45 further includes a resistor bank 62 for adjusting the voltages of the digital control signals received from the digital control IC 60 via the socket 55 to the 0 and 5 volt levels recognizable as "0" and "1" control signals by the sensor IC 46. These digital control signals are conducted to the S2 and S3 pins of the sensor IC 46 as shown. Additionally, the output pin ("out6") of the sensor IC 46 is connected to an input of the digital control IC 60 so that the digital control IC can determine the intensity of the perceived color components in a manner which will be explained in more detail hereinafter. Finally, capacitors 63*a, b* are included to stabilize the voltage of the digital control signals received by the sensor IC 46 via the resistor bank 62.

The constant current circuit 53 illustrated in FIG. 6 includes a current control IC 54 which, in the preferred embodiment, is a LM317 IC manufactured by National Semiconductor located in Santa Clara, Calif. One input of the IC 54 is connected to the 15 volt input 66 from the socket 55. The power output of the IC 54 is serially connected to a connector 76 by way of a precision resistor 72, which (in combination with the other components of the LM317 IC) reduces the voltage of the power received from the socket 55 from 15 volts to about 1.25 volts. The connector is in turn connected to the white LED 42. In operation, the current control IC 54 continuously monitors the voltage drop across the precision resistor 72 via second input and continuously adjusts the voltage of its output so that the current conducted to the white LED 42 via the connector 76 remains constant. Capacitors 74*a, b* are connected as shown to filter out high frequency noise from the input of the IC 70.

Figure 7:
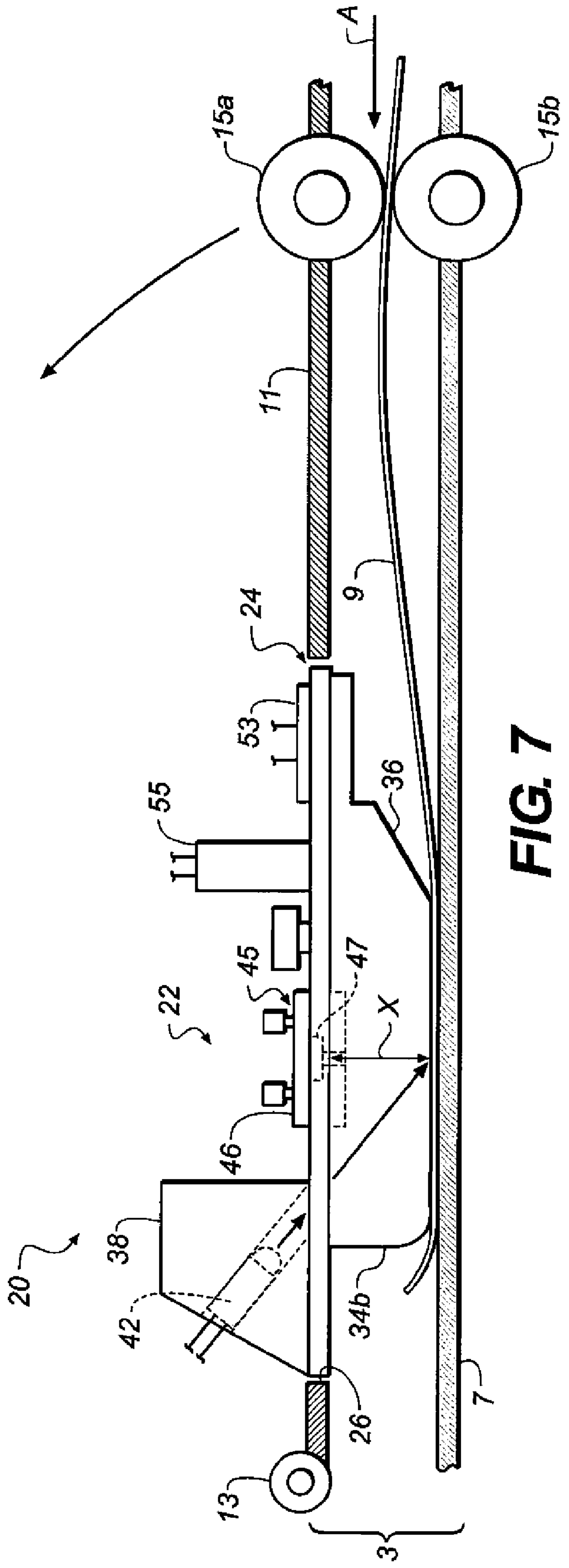
FIG. 7 is a side view of the optical sensor assembly of the invention in operation in a paper transport section of a printer.

The mechanical operation of the optical sensor assembly 20 is best understood with reference to FIG. 7. As previously indicated, the densitometer 22 is received into a floating mounting 24 formed from a complementarily-shaped opening 26 in the top plate 11 of a paper transport section 3 of a printer. The opening 26 should loosely receive the frame 30 of the densitometer such that vertical movement within the opening is relatively unimpeded by scraping or other frictional forces. Sheets 9 printed with a sequence of rectangular test patches colored cyan, magenta, yellow, gray and black are propelled through the paper transport section 3 via pinch rollers 15*a, b* in the direction "A". The leading edges of the printed sheets 9 initially engage the tapered leading edges 36 of the engagement blades 34*a, b* such that the densitometer 22 begins to slide over the surface of the printed paper 9 in ski-like fashion. Importantly, the weight of the densitometer (which is preferably 16 grams) is sufficient, under most circumstances, to press the printed sheet into flat contact with the bottom plate 7 of the transport section 3 without the promotion of paper jamming caused by snagging or resistance to the movement of the sheets 9 through the paper transport section 3. However, in the event that some vertical movement occurs between the sheet 9 and the bottom plate 7 as the sheet traverses under the densitometer, the floating mounting will accommodate all such vertical movement. The resulting floating action and balance of forces between the weight of the densitometer 22 and vertical movement of the printed sheets 9 as a result of fluttering or paper curl advantageously maintains the critical distance X between the portion 43 lighted by the white LED 42 and the array of phototransistors 47 of the sensor IC 46 whether the sheet is flat against the bottom plate 7 or raised above it.

Figure 8:
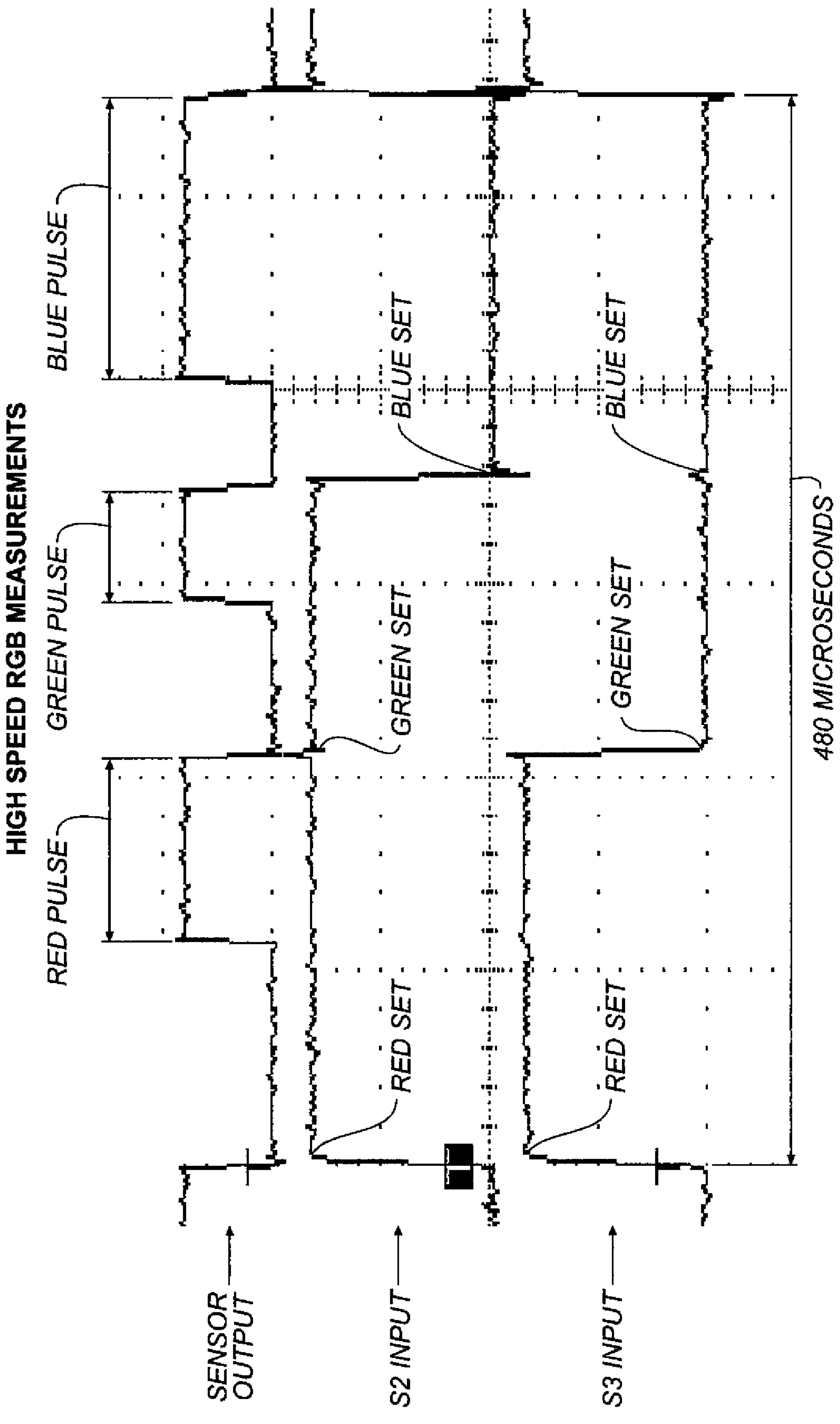
FIG. 8 is tracing illustrating how the digital control IC controls the red, green and blue pulse outputs of optical sensor IC used in the circuitry of the densitometer during the operation of the optical sensor assembly.

The operation of the optical sensor circuit 45 during the transport of the sheets 9 under the densitometer can best be understood with reference both to FIGS. 6 and 8. Initially, the digital control IC 60 transmits "1" or "0" digital control pulses to pins S2 and S3 of the sensor IC 45 in one of the patterns "1, 1", "1, 0" or "0, 0", which actuate one of the red, green or blue sensitive phototransistors, respectively. In this example, let us assume that the digital control IC 60 transmits a "1" pulse to S2 and a "1" pulse to S3 as is illustrated in the pulse tracing of FIG. 8. This signal pattern actuates the red phototransistors in the array of the 47 of the sensor IC 46. The sensor IC in turn generates a pulse having a width over time (designated "red pulse" in FIG. 8). The output pin ("out6") of the sensor IC 46 is connected to an input of the digital control circuit 60, and when the digital control IC 60 senses the voltage drop associated with the trailing edge of the red pulse, it simultaneously (1) measures the width of the red pulse over time in order to determine the frequency thereof (which in turn corresponds to the intensity of red light perceived by the sensor IC 46), and changes the pattern of control signals from "1, 1" to "1,0" thereby actuating the green phototransistors in the array of the 47 of the sensor IC 46. When the digital control IC 60 senses the voltage drop associated with the trailing edge of the green pulse, it simultaneously measures the time length of the green pulse, and changes the pattern of control signals from "1,0" to "0, 0" thereby actuating the blue phototransistors in the array of the 47 of the sensor IC 46. The pattern is sequentially repeated such that the pulse length, and hence the intensity, of red, green and blue light reflected from the test patches on the moving printed sheet sliding under the densitometer is continuously measured.

Figure 9:
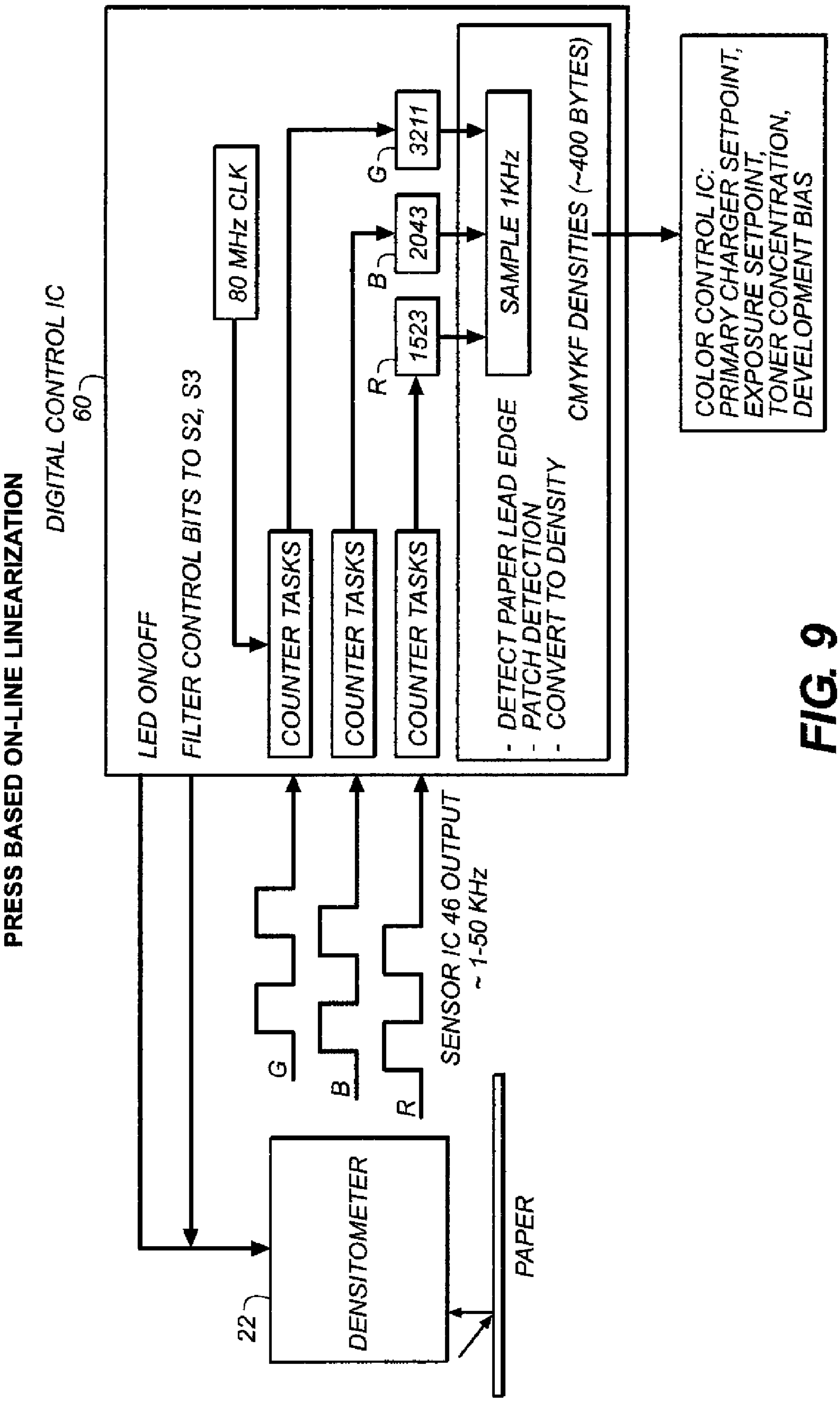
FIG. 9 is a schematic illustrating the over-all operation of the circuitry of the optical sensor assembly of the invention.

FIG. 9 illustrates the manner in which the digital control IC 60 processes data received from the optical sensor circuit 45. After actuating the white LED 42 relaying the aforementioned sequence of control signals to the optical sensor circuit 45, counter circuits in the digital control IC 60 determine the frequency associated with the measured pulse width for each of the red, blue and green pulse outputs generated by the optical sensor circuit 45. The calculated frequencies for each color is then stored and continuously averaged The averaged output for all three colors is then sampled at a frequency of 1

Figure 10:
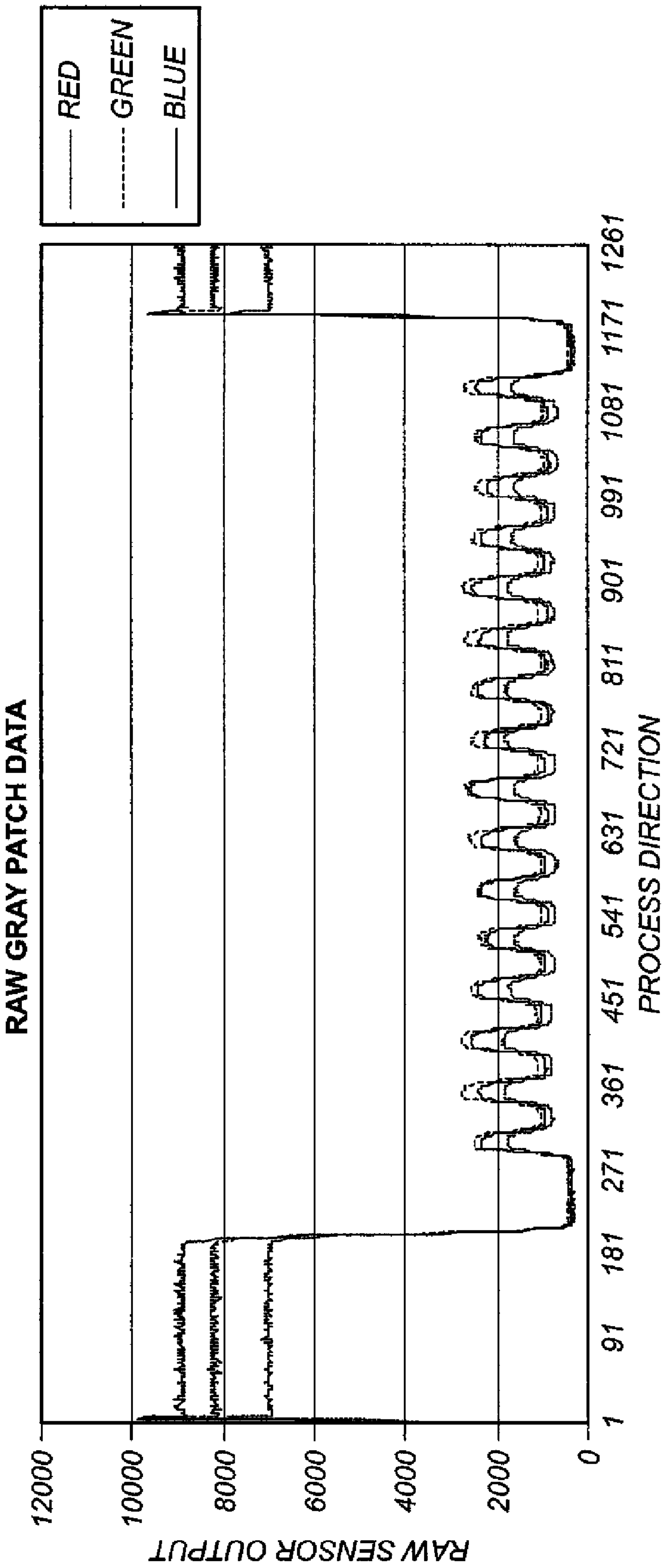
FIG. 10 is a graph illustrating how the sensor output varies as a function of the particular page being scanned.

KHz, or every one-thousandth of a second. FIG. 10 illustrates the output of the digital control IC 60 at this stage of data processing, and clearly illustrates that the 1 KHz sampling frequency is ample to detect the leading and trailing edges of a printed sheet, as well as leading and trailing edges of an alternating pattern of cyan, magenta, yellow and black colored patches. In the test graph of FIG. 10, the printed sheet was transported under the densitometer 22 at the same speed that a printed sheet would move in the paper transport section 3 during an actual calibration test, and the colored patches (formed from a pattern of alternating dark and light gray color patches) were the same size and shape the alternating pattern of cyan, magenta, yellow and black colored patches that would be used during such a test. Here, each of the 16 peaks corresponds to dark the dark gray, while each of the 15 valleys corresponds to the light gray patches. In the final stages of processing, the averaged output for red, blue and green is associated with one of the cyan, magenta, yellow and black color test patches, and converted to a color density parameter representative of the measured color density of the particular cyan, magenta, yellow and black color test patches. This measured color density parameter is compared to a desired target color density parameter for each of the cyan, magenta, yellow and black color patches. Any significant difference between the measured color density and the desired color density is relayed to a color control IC of the electrostatographic printer, which proceeds to adjust one or more of the color controls of the printer to bring the measured color densities in line with the desired color densities.

Figure 11:
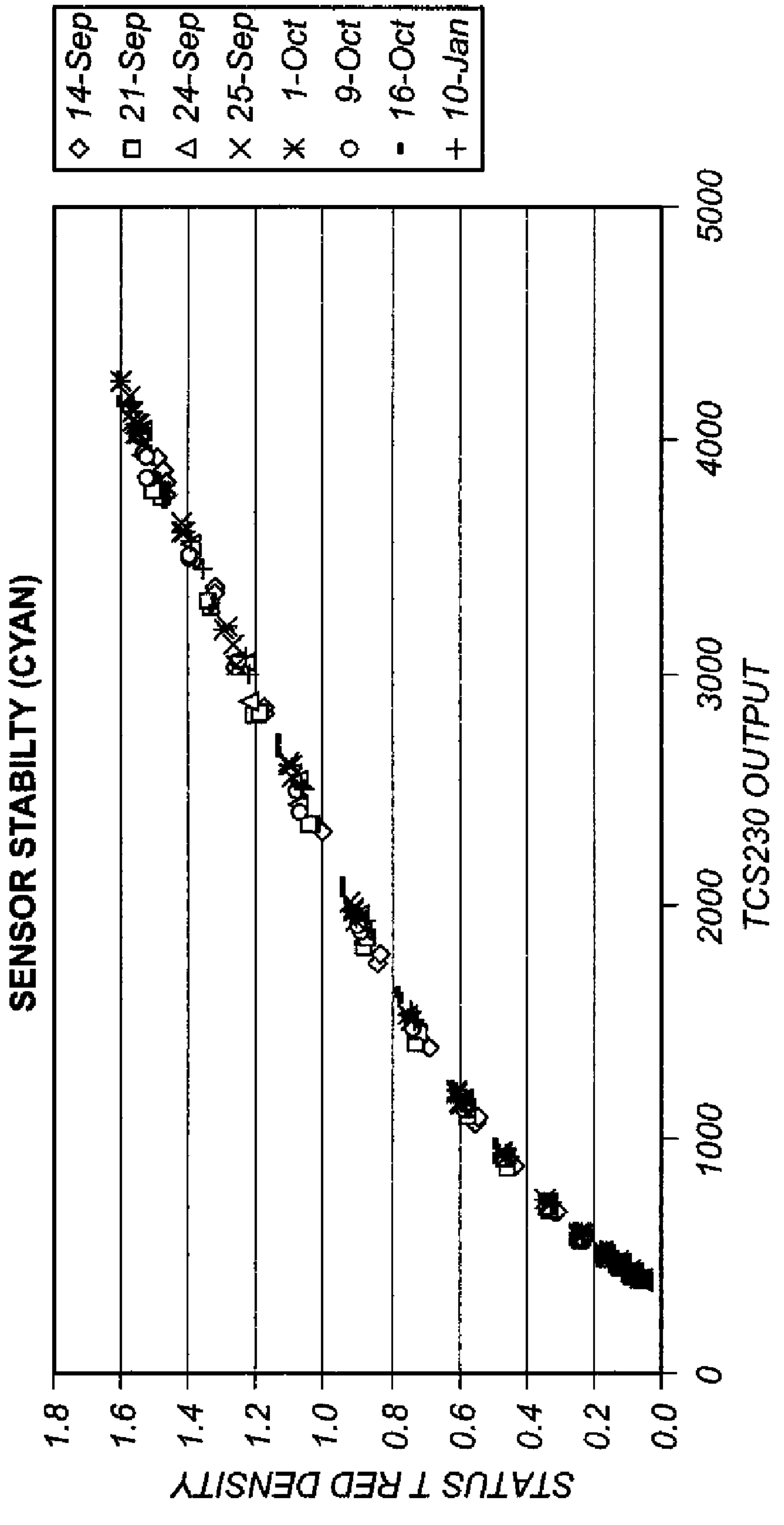
FIG. 11 is a graph of the cyan signal output of the optical sensor IC used in the circuitry of the densitometer over a four month time period, illustrating the stability of this signal over time.

Finally, FIG. 11 demonstrates the high degree of consistent output of the Taos TSC230 sensor chip preferably used as the sensor IC 46 in the densitometer 22 of the invention. The graph of FIG. 11 demonstrates that the Taos TSC230 sensor chip color provided accurate and consistent density measurements made by over an approximately four month period over a broad range of cyan densities. The lack of any significant variation in the color density measurements over such a length of time indicates that this particular sensor chip can be relied upon to calibrate the color controls of a printer.

The invention has been described in detail with particular reference to certain preferred embodiments thereof, but it will be understood that variations and modifications can be effected within the scope of the invention. For example, while only one densitometer in a printer has been shown, the invention is readily adaptable to an embodiment where multiple densitometers are used in a same printer.

LIST OF PARTS

1. densitometer (prior art)
2. paper transport section
5. fuser roller
7. bottom plate
9. printed sheets
11. top plate
13. hinge
15. rollers a, b
20. optical sensor assembly
22. densitometer of the invention
24. floating mounting
26. opening
30. frame
32. table portion
33. densitometer circuitry
34. engagement blades a, b
36. tapered leading edges
38. light source housing
40. cylindrical bore
42. white LED
43. lighted paper portion
45. optical sensor circuit
46. sensor IC
47. array of phototransistors
49. recess in support table
51. aperture
53. constant current circuit
54. current control IC
55. electrical socket
57. connector
60. control circuit
62. resistor bank
64. capacitors a, b
66. power input
72. precision resistor
74. capacitors a, b
76. power socket

The invention claimed is:

1. An optical sensor assembly that measures optical reflection density on a printed sheet horizontally conveyed and supported by a paper transport section of a printer, comprising:

a densitometer including a frame having an engagement portion that engages said moving printed sheet, a light source mounted on said frame that illuminates a portion of said printed sheet at a continuous intensity, and a photo-detector mounted on said frame and positioned to receive light from said light source that is reflected off said printed sheet, and a mounting that floatably mounts said densitometer in said printer such that said engagement portion of said frame engages said printed sheet in constant sliding contact as it moves through said paper transport section as a result of the weight of the densitometer, wherein a constant, predetermined distance is maintained between said photo-detector and said illuminated portion of said moving printed sheet regardless of vertical movement of said printed sheet within said paper transport section as a result of said sliding contact.

2. The optical sensor assembly defined in claim 1, wherein the weight of the densitometer provides all of a force that biases the engagement portion of said housing into sliding contact with said printed sheet.

3. The optical sensor assembly defined in claim 2, wherein said densitometer weighs between 12 and 20 grams.

4. The optical sensor assembly defined in claim 2, wherein the mounting includes a portion of the paper transport section disposed over the printed moving sheet, and wherein the transport section portion and the densitometer frame are loosely and slidably connected such that the frame can move vertically in response to vertical movements of said printed sheet.

5. The optical sensor assembly defined in claim 4, wherein the paper transport section includes a top plate having an opening or recess that loosely and slidably receives the densitometer frame along a vertical axis.

6. The optical sensor assembly defined in claim 1, wherein said engagement portion of said frame includes at least one tapered blade for slidably engaging said moving printed sheet without snagging leading edges of said sheet.

7. The optical sensor assembly defined in claim 1, wherein said photo-detector is positioned on said frame to receive only light from said light source that is diffusely reflected from said printed sheet.

8. The optical sensor assembly defined in claim 1, wherein said frame has an aperture that conducts light reflected by said printed sheets to said photo-detector.

9. The optical sensor assembly defined in claim 1, wherein said light source is contained and mounted on said frame to transmit light at an oblique angle toward the printed sheet.

10. The optical sensor assembly defined in claim 1, wherein said light source transmits a broad range of visible light wavelengths.

11. An optical sensor assembly that measures optical reflection density on a printed sheet horizontally conveyed and supported by a paper transport section of a printer, comprising:

a densitometer including a frame having an engagement portion that engages said moving printed sheet; a light source mounted on said frame that illuminates a portion of said printed sheet at a continuous intensity, and a photo-detector mounted on said frame and positioned to receive light from said light source that is reflected off said printed sheet, and a mounting that floatably mounts said densitometer in said paper transport section such that said engagement portion of said frame engages said printed sheet in constant sliding contact as it moves through said paper transport section exclusively as a result of the weight of the densitometer, wherein a constant, predetermined distance is maintained between said photo-detector and said illuminated portion of said moving printed sheet regardless of vertical movement of said printed sheet within said paper transport section as a result of said sliding contact.

12. The optical sensor assembly defined in claim 11, wherein the mounting includes an opening or a recess in a cover plate of the paper transport section that slidably and loosely receives said densitometer frame.

13. The optical sensor assembly defined in claim 11, wherein said engagement portion of said frame includes a pair of tapered blades for slidably engaging said moving printed sheet without snagging leading edges of said sheet.

14. The optical sensor assembly defined in claim 11, wherein said photo-detector is positioned on said frame to receive only light from said light source that is diffusely reflected from said printed sheet.

15. The optical sensor assembly defined in claim 11, wherein said frame has an aperture that conducts light reflected by said printed sheets to said photo-detector.

16. The optical sensor assembly defined in claim 11, wherein said light source is contained and mounted on said frame to transmit light at an oblique angle toward the printed sheet.

17. The optical sensor assembly defined in claim 11, wherein said light source transmits a broad range of visible light wavelengths.

18. The optical sensor assembly defined in claim 11, wherein said photo-detector directly receives reflected light from said light source without the use of a focusing lens.

19. The optical sensor assembly defined in claim 11, wherein said light source includes an LED powered by a constant current circuit to avoid variations in light output intensity.

20. The optical sensor assembly defined in claim 11, wherein said densitometer weighs between 12 and 20 grams.

* * * * *